Figure 1:
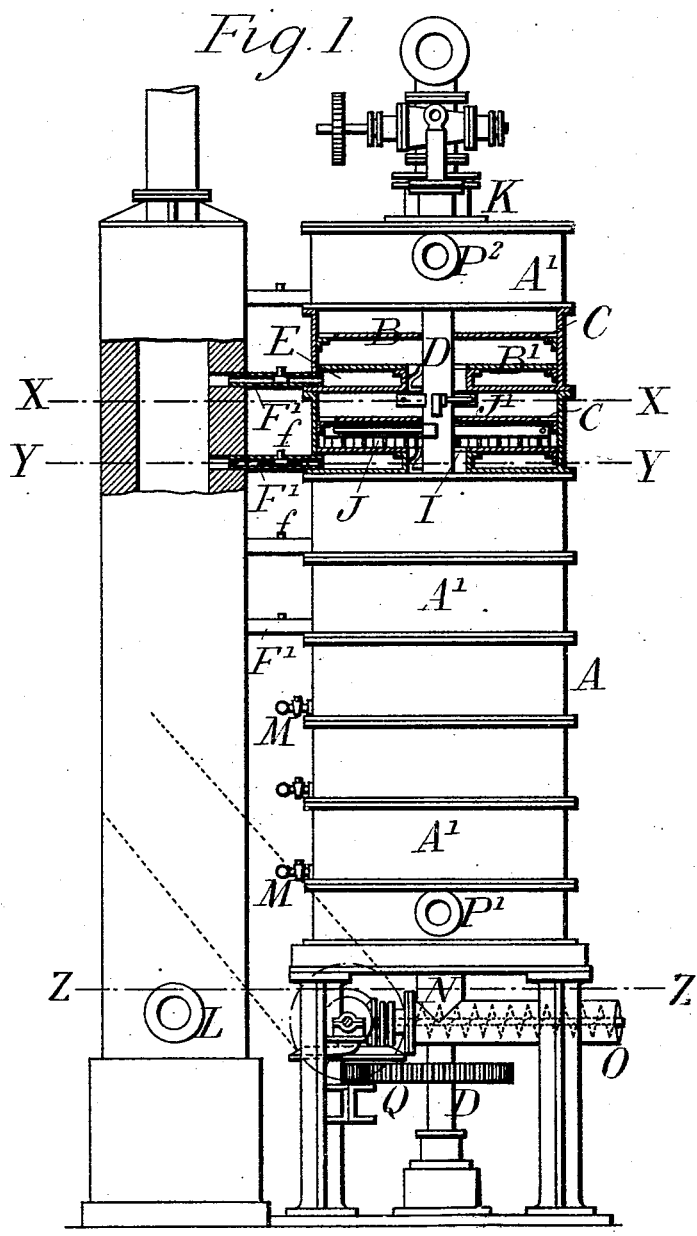

(No Model.) 2 Sheets—Sheet 1.
L. MOND.
APPARATUS FOR TREATING SUBSTANCES WITH GASES AT ELEVATED TEMPERATURES.

No. 551,221. Patented Dec. 10, 1895.

Witnesses. Inventor.
Ludwig Mond.
By James L. Norris.
Atty.

(No Model.) 2 Sheets—Sheet 2.
L. MOND.
APPARATUS FOR TREATING SUBSTANCES WITH GASES AT ELEVATED TEMPERATURES.
No. 551,221. Patented Dec. 10, 1895.
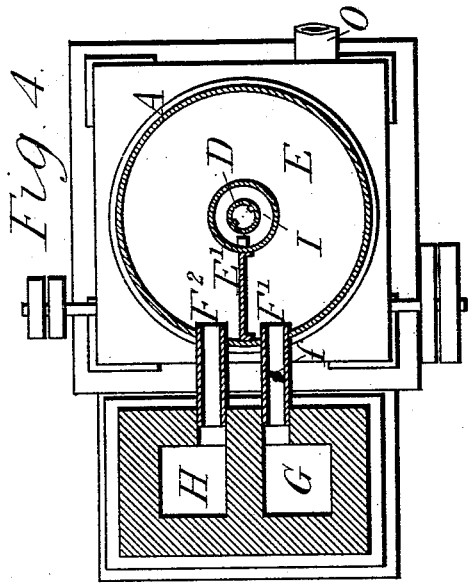
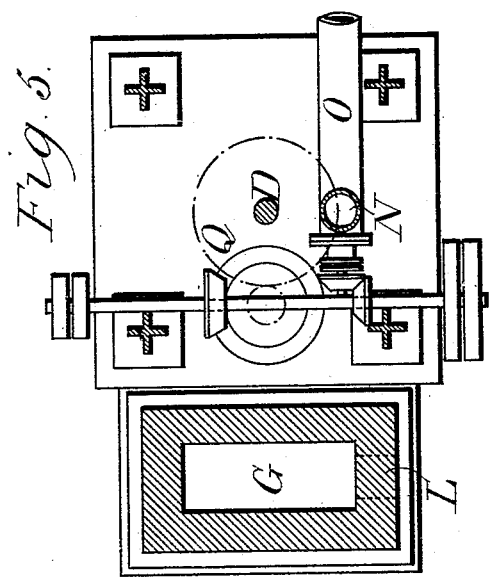
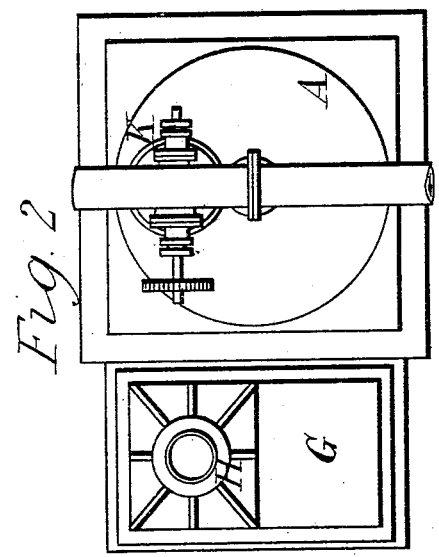
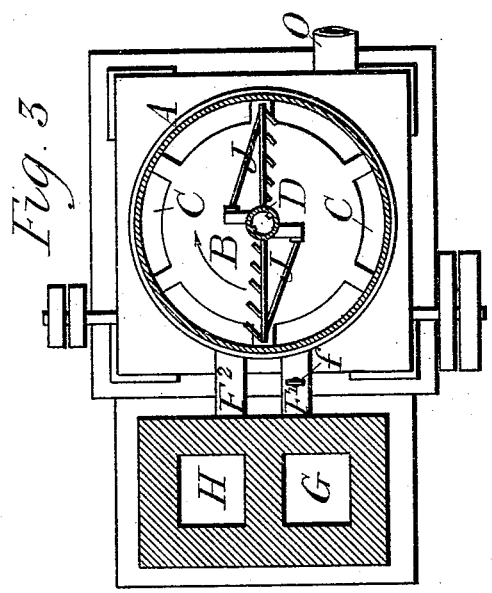
Witnesses.
Inventor.
Ludwig Mond.
By James L. Norris
Atty.

UNITED STATES PATENT OFFICE.

LUDWIG MOND, OF LONDON, ENGLAND.

APPARATUS FOR TREATING SUBSTANCES WITH GASES AT ELEVATED TEMPERATURES.

SPECIFICATION forming part of Letters Patent No. 551,221, dated December 10, 1895.

Application filed September 5, 1895. Serial No. 561,588. (No model.)

*To all whom it may concern:*

Be it known that I, LUDWIG MOND, a citizen of England, residing at No. 20 Avenue Road, Regents Park, London, in the county of London, England, have invented a certain new and useful Apparatus for Treating Solid and Pasty Substances with Gases at Elevated Temperatures, of which the following is a specification.

My invention has for its object the construction of an apparatus for treating solids and pasty substances with gases at elevated temperatures, wherein the material to be treated is made to descend consecutively through a number of superposed compartments in an upright chamber of cylindrical or other form, each such compartment being heated separately in a controllable manner by providing the same with a chamber that is made to communicate with a combustion-chamber for gaseous fuel. By this means a uniform heating to a high degree of the entire body of material to be acted upon by the gases as it passes down through the reducing-chamber is attained, the degree of such heating being under perfect control, which is of great importance in many operations where solid materials are subjected to the action of gases. When required the said chambers of one or more of the lower compartments, instead of being put in communication with the combustion-chamber, are put in communication with a cold air or water supply, for the purpose of cooling down the material before it issues from the apparatus.

I will proceed to describe the construction of the said apparatus with reference to the accompanying drawings, in which—

Figure 1 shows an elevation partly in section; Fig. 2, a plan; and Figs. 3, 4, and 5 cross-sections taken respectively on lines X X, Y Y, and Z Z of Fig. 1.

The apparatus consists of a cylindrical chamber A, which is built up of a number of short cylinder-sections A' A' A'. Each of these cylinder-sections is divided by two plates or trays B B' into two compartments. The upper tray has openings C C at its periphery, while at the center it fits round the vertical shaft D carrying stirring devices, as will be presently explained. The lower tray B' has formed beneath it a chamber E communicating by flues F' F² with a combustion-chamber G and chimney-shaft H. The tray B' with its chamber E fits close against the sides of the cylinder and has an opening I at the center of such a size as to leave an annular opening round the central shaft. On the central shaft D are fixed arms carrying stirrers or scrapers J J', of which the stirrers J acting on the trays B tend to move the material from the center of the tray to the periphery where it falls through the openings C onto the tray B' below. The stirrers J' on this tray are on the other hand so arranged as to move the material from the periphery toward the center, so as to fall through the opening I onto the next tray below, so that by this means the pulverulent, granular or pasty material introduced through an opening K at top is made to descend successively from one compartment to another, while at the same time it is heated to any required degree by the chambers E. These chambers are formed with a partition E' on one side thereof, as shown at Fig. 4, and on one side of this partition they communicate by means of the flue F' provided with a valve $f$, with the combustion-chamber G for gaseous fuel, and on the other side of the partition they communicate by a flue F² with the chimney-shaft H, which only communicates with the combustion-chamber through the flues F' F², so that the highly-heated combustion-gases generated in the combustion-chamber from gaseous fuel introduced through the opening L at bottom are made to circulate in a very perfect and uniform manner through all the chambers E on their way to the chimney H. The whole of the chambers E may be made to communicate with the combustion-chamber, as described, or when it is required to cool down the material treated before it leaves the apparatus the lower chambers may be put in connection with a cold water or air supply by means of branch pipes and valves M, as shown.

Arrived at the bottom of the apparatus the material is discharged through a pipe N, either into a conveying-worm O, for transporting it to any desired locality, or it may be discharged at once into receptacles placed to receive it.

The gas with which the material is to be treated is introduced into the apparatus through the opening P' at bottom and, after ascending through all the compartments either by natural or forced draft in close contact with the descending material, it issues through the discharge-opening P² at top.

The requisite rotary motion is imparted to the stirrer-shaft D from any suitable motor by means of gearing Q.

Having thus described the nature of my invention and the best means I know for carrying the same into practical effect, I claim—

1. Apparatus for treating solid or pasty materials with gases at high temperatures, consisting of an upright chamber divided by trays or partitions into a number of superposed compartments, arranged to communicate with each other, a heating chamber in each compartment that is made to communicate with a combustion chamber for gaseous fuel arranged at the side of the apparatus so that each of the said heating chambers communicates directly therewith, a chimney flue with which each heating chamber is also made to communicate, so that the hot combustion gases are made to pass from the combustion chamber through the heating chambers on their way to the chimney, means for supplying the upper end of the apparatus with the solid material to be treated, and for discharging it at the lower end, a stirring device for causing the material to descend from one compartment of the apparatus to the next below, and means for passing the gas with which the material is to be treated in an upward direction through the apparatus, substantially as described.

2. Apparatus for treating solid or pasty materials with gases at high temperatures consisting of an upright chamber divided by trays or partitions into a number of superposed compartments arranged to communicate with each other, a heating chamber in each of the upper compartments which chamber is made to communicate directly respectively with a combustion chamber for gaseous fuel arranged at the side of the apparatus and with a chimney flue, a cooling chamber in each of the lowermost compartments communicating with a cold water supply, means for supplying the upper end of the apparatus with the solid material to be treated, and for discharging it at the lower end, a stirring device for causing the material to descend from one compartment of the apparatus to the next below, and means for passing the gas with which the material is to be treated, in an upward direction through the apparatus, substantially as described.

3. In apparatus for treating solid or pasty materials with gases at high temperatures the combination with trays such as B B' dividing the apparatus into a number of superposed compartments through which the solid or pasty material to be treated is made to descend consecutively, of heating chambers such as E divided by partitions E', on one side of which the said chambers communicate with a combustion chamber such as G at the side of the said apparatus by means of flues F' while on the other side they communicate with a chimney flue H by flues F², whereby the hot combustion gases are made to circulate from the combustion chamber G through the heating chambers E on their way to the chimney, substantially as described.

4. In apparatus for treating solid or pasty material with gases at high temperatures, the combination of a chamber A composed of superposed cylinder sections A', trays B B' dividing each such cylinder section into two compartments, communicating with each other, a heating chamber E below each tray B', divided by a partition E', a combustion chamber G for gaseous fuel, extending up at the side of the chamber A, a chimney flue H extending up at the side of the combustion chamber, but having no direct communication therewith, flues F' on one side of the partition E' establishing a communication between the heating chambers E and the combustion chamber G, flues F² on the other side of said partition establishing a communication between chambers E and chimney flue H, means for supplying the solid or pasty material to be treated to the top of the chamber A, a stirring device for causing the material to descend from one compartment to another, and means for passing the gas with which the material is to be treated in an upward direction through the compartments of the chamber A, substantially as described.

In testimony whereof I have signed my name to this specification, in the presence of two subscribing witnesses, this 16th day of August, A. D. 1895.

LUDWIG MOND.

Witnesses:
 CHAS. D. ABEL,
 JNO. P. M. MILLARD.